United States Patent
Stampe

(10) Patent No.: US 6,467,430 B1
(45) Date of Patent: Oct. 22, 2002

(54) APPARATUS FOR DETECTING ESTRUS IN LIVESTOCK

(75) Inventor: David A. Stampe, 930 Redwood Cir., Apple Valley, MN (US) 55124

(73) Assignee: David A. Stampe, Apple Valley, MN (US)

( * ) Notice: Subject to any disclaimer, the term of this patent is extended or adjusted under 35 U.S.C. 154(b) by 0 days.

(21) Appl. No.: 09/918,285

(22) Filed: Jul. 30, 2001

(51) Int. Cl.⁷ .............................................. A01K 29/00
(52) U.S. Cl. ...................................................... 119/174
(58) Field of Search ................................ 119/174, 823; 128/738; 600/551, 587

(56) References Cited

U.S. PATENT DOCUMENTS

| | | |
|---|---|---|
| 1,237,983 A | 8/1917 | Werner |
| 2,487,557 A | 11/1949 | Jourgensen |
| 2,678,022 A | 5/1954 | Jourgensen |
| 3,076,431 A | 2/1963 | Rule et al. |
| 3,158,133 A | 11/1964 | Larson |
| 3,205,857 A | 9/1965 | Larson |
| 3,603,291 A | 9/1971 | Baker |
| 3,824,989 A | 7/1974 | Horner et al. |
| 3,842,802 A | 10/1974 | Lang et al. |
| 3,942,475 A * | 3/1976 | Wassilieff et al. ............. 119/1 |
| 4,206,766 A * | 6/1980 | Bielka ......................... 128/738 |
| 4,239,018 A * | 12/1980 | Griffin et al. .................. 119/1 |
| 4,563,980 A | 1/1986 | Thompson |
| 4,635,587 A * | 1/1987 | Leonardo ....................... 119/1 |
| 4,685,421 A * | 8/1987 | Colburn, Jr. ................... 119/1 |
| 4,696,258 A | 9/1987 | Magrath et al. |
| 4,846,106 A * | 7/1989 | Leonardo ....................... 119/1 |
| 4,895,165 A * | 1/1990 | Blair .......................... 128/738 |
| 5,542,431 A | 8/1996 | Starzl et al. |
| 5,566,679 A * | 10/1996 | Herriott ...................... 128/738 |
| 5,839,390 A * | 11/1998 | Meads ......................... 119/174 |
| 5,881,673 A * | 3/1999 | Beach et al. ................. 119/174 |

\* cited by examiner

Primary Examiner—Charles T. Jordan
Assistant Examiner—Bret Hayes
(74) Attorney, Agent, or Firm—Fredrikson & Byron, P.A.

(57) ABSTRACT

An indicator apparatus for use in indicating when an animal is in estrus. The apparatus is configured to be affixed to the rump of an animal to detect and indicate when the animal has been mounted and, thus, when the animal is in estrus. The apparatus is affixed to the animal by an adhesive layer. Layered on the top surface of the adhesive layer is an indicator layer that is in turn covered with a floodcoat layer. The floodcoat layer is adapted for removal upon the mounting of the first animal by a second animal. Removal of the floodcoat layer exposes the indicator layer indicating that the first animal has been mounted, thereby indicating that the first animal is in heat. The floodcoat layer is highly visible and may be seen from a distance.

13 Claims, 4 Drawing Sheets

APPARATUS FOR DETECTING ESTRUS IN LIVESTOCK

BACKGROUND OF THE INVENTION

1. Field of the Invention

The present invention relates to an indicator apparatus used to detect when an animal is in estrus (heat), and more particularly, to such an indicator wherein the indicator is adapted to be worn by a first animal for indicating when the first animal is mounted by a second animal and, thereby, when the first animal is in heat. The invention further relates to an apparatus for providing a plurality of indicators that may be individually sized to suit specific needs.

2. Description of the Related Art

It is typically desirable in the field of animal husbandry to selectively breed livestock. This may be done by mating selected animals, artificially inseminating an animal, or any other suitable method. However, any method used entails determining when the animal is in heat in order for insemination to fertilize the animal. The heat cycle is of a short duration and insemination must occur during the cycle. The accurate detection of estrus is a problem long recognized in the prior art.

Typically, when an animal, for example, a cow, is not in heat, she will not allow herself to be mounted. Conversely, when a cow is in heat, the cow will show an increased tendency to stand and permit itself to be mounted by other animals for an appreciable time. When the mounted animal allows the mounting animal to remain for about five seconds, a "standing mount" has occurred and the cow is classified as in standing heat. This condition occurs in the early stages of estrus. The most frequent mountings occur by bulls, but mountings are also made by other cows. Accordingly, the repeated mounting of a cow by any other such animal is a good indication that the cow is in heat.

The identification of cows in heat has traditionally been accomplished by observation, the cows seen to allow mounting by other cows being separated from the herd. While visual inspection and observation of a herd may be employed to identify and segregate females in heat, because the heat cycle is of short duration, such visual observation must be conducted at least twice daily and accompanied by immediate segregation of marking of the animals to be inseminated. Visual observation of the herd, which is often widely dispersed, is typically inefficient. Further, if no indicating device is used, unless the herd is maintained under constant visual observation, the heat cycle may go undetected in many animals.

A variety of prior art devices have been developed for indicating when an animal is in heat by showing when the animal has been mounted. Automatic indicators have been used that are attached to the top rear section of the animal between the hip-bone and spine and are set off by other animals mounting the animal in heat. Typically, the indicators rely on the pressure exerted by the chest or brisket of the mounting animal. A common indicator of this type includes a passive apparatus including a reservoir of marker fluid which is compressed by the mounting pressure to discharge some or all fluid and thereby mark the mounted animal. Frequently, these devices suffer from incidental seepage of the marker fluid. This can result in an undesirably short shelf-life of the product. Further, the prior art devices involve complicated dye packet devices that are undesirably complex and expensive.

SUMMARY OF THE INVENTION

The invention is an indicator apparatus to be worn externally be a first animal for detecting when the first animal is in heat. The apparatus is configured to be secured to the rump portion of the first animal and to indicate when the first animal is mounted by a second animal, thereby indicating when the first animal is in heat. The apparatus provides an indicator layer that is normally obscured by a floodcoat but is exposed upon mounting of the first animal by a second animal.

An estrus indicator is provided that has an indicator layer, a first adhesive layer positioned beneath the bottom surface of the indicator layer, and a floodcoat layer detachably affixed to the top surface of the indicator layer. The non-indicator layer side of the first adhesive layer may optionally be covered by a liner. By exposing the first adhesive layer the indicator may be affixed to the rump portion of the first animal. The floodcoat layer is typically removed by the mounting of the first animal by a second animal. This can be a result either of adhesion of the floodcoat layer to the second animal or frictional wear of the floodcoat layer by the second animal. Removal of the floodcoat layer exposes the indicator layer. Thus, exposure of the indicator layer indicates that the first animal is in heat.

The floodcoat layer is adapted to be removed upon exertion of a preselected pressure. This pressure is selected to coincide with the force applied by the mounting of the first animal by a second animal. By providing that at least a predetermined pressure must be exerted on the indicator in order to remove the floodcoat layer and expose the indicator layer, accidental exposure of the indicator layer caused by pressures that are less than those occurring during an actual mounting, such as those caused by a second animal resting its head on the apparatus, are prevented.

The indicator layer is designed to be viewable from a distance regardless of weather conditions. Thus, an observer may view the indicator layer and note that the floodcoat layer has been removed. The first animal can then be segregated from the herd for insemination.

Thus, the estrus indicator provides a method for indicating when a first animal is in heat by indicating when the first animal has been mounted by a second animal. The indicator is a reliable, easily observed indicator and is not affected by weather. Further, the indicator is mechanically simple, durable, and inexpensive.

A preferred embodiment of the invention provides an apparatus for inexpensively supplying a plurality of estrus indicators wherein the size of the indicator may be chosen to fit specific needs. In that embodiment, the estrus indicators are configured as a single sheet rather than as individual units or pieces. The single sheet may then be cut into pieces of size and/or shape as specifically desired. One option is to provide the sheet of indicators on a roll. The sheet may then be unrolled and cut as desired. The roll is relatively inexpensive and provides a flexible option for the users of the estrus indicators. Further, the roll takes up little space and conveniently stores a plurality of estrus indicators.

DETAILED DESCRIPTION OF THE DRAWINGS

The present invention provides a simple and durable indicator apparatus for detecting and indicating when a first animal is in heat. Although throughout this application, a cow is used as an example, it is to be understood that the present invention may be easily adapted to be used to detect heat in other animals such as horses, sheep, goats, swine, etc.

Figure 1:
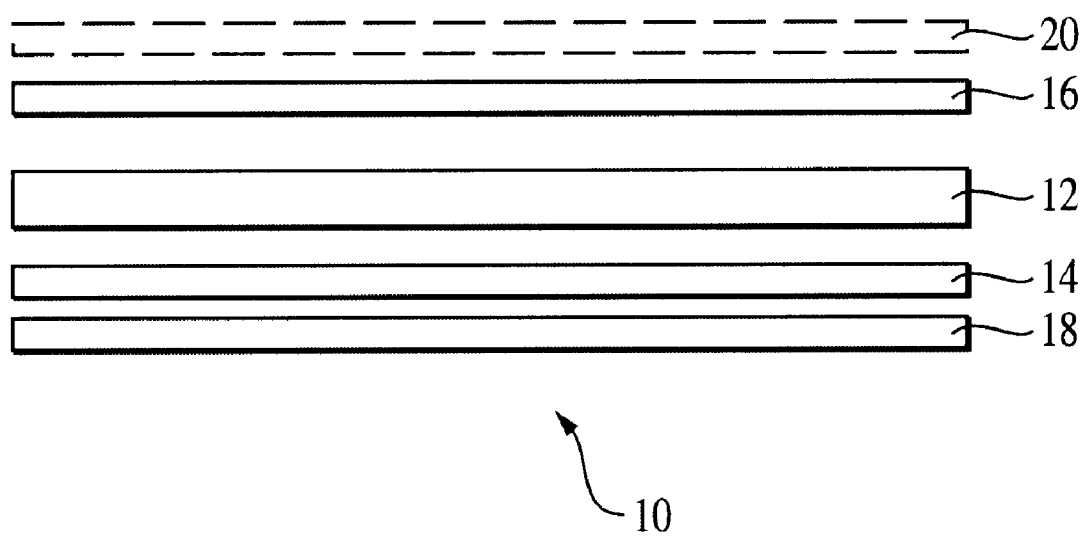
FIG. 1 is an exploded side view of a first embodiment of the invention.

FIG. 1 depicts an exploded side view of a first embodiment of the invention. Most simply, the apparatus is provided as a patch for adhesion to a first animal, the patch being configured for a visual change upon mounting of the first animal by a second animal. Typically, mounting of a first animal by a second animal is an indication that the first animal is in heat. The patch is designed for application to the rump of a first animal, above the base of the tail.

The estrus indicator is made up of a plurality of layers. The indicator layer 12 is diagrammatically in the middle of the indicator 10. The indicator layer 12 has an adhesive 14 on its bottom side for attachment to the first animal. A floodcoat 16 is positioned on the top side of the indicator layer 12 to obscure the indicator layer 12 until the floodcoat 16 is removed. Prior to deployment of the indicator 10 on the first animal, a liner 18 is provided along the adhesive 14 and the floodcoat 16.

The indicator layer 12 is designed to be highly visible such that it may be viewed from some distance and does not camouflage on any naturally-occurring color of heifer. Optionally, the indicator layer 12 may be a reflective or prismatic foil. An example reflective foil is, manufactured by Spectratek (of Los Angeles, Calif., www.spectratek.net/productlines/holographic/patterns/index.html). The reflective foil provides high visibililty regardless of weather (in either sunlight or overcast conditions). If light is available the reflective foil is reflective.

The first adhesive layer 14 affixes the indicator layer 12 and, thus, the indicator apparatus 10 to the first animal. The composition of the adhesive used in the first adhesive layer 14 should provide sufficient fixation such that the apparatus will remain affixed to the first animal after mounting by a second animal. Desirably, the adhesive provides excellent initial tack and good adhesion to animal hide. The adhesive may be, for example, a rubber based adhesive such as TL-1000 manufactured by Wausau Coated Products. Providing the first adhesive layer 14 as precoated layer provides for simple application of the indicator 10 to the first animal. However, as desired, the indicator 10 may be affixed by a separate manual application of glue or other adhesives. When a precoated adhesive layer is used as the first adhesive layer 14, a removable liner 18 is preferably provided to protect the adhesive from soiling or inadvertent adherence to a non-selected surface. When it is desired to affix the apparatus to the first animal, the adhesive is exposed by removing the liner 18. The adhesive layer 14 is thus exposed and the indicator 10 can be affixed to the animal on the animal's back on the spine at the base of the tail.

Optionally, a liner is provided over the top surface of the first adhesive layer.

Over the indicator layer 12 is a floodcoat 16 (or "mask adhesive") layer, removal of which exposes the indicator layer 12 to indicate that the animal has been mounted, thereby indicating that the animal is in heat. In order for removal of the floodcoat layer 16 to expose the indicator layer 12, the floodcoat layer 16 is preferably an opaque layer that, when in place, totally obscures the indicator layer 12. In a preferred embodiment, the floodcoat layer 16 is a black layer. The floodcoat 16 is preferably removable, such as an emulsion acrylic removable/repositionable adhesive. In this way, while the floodcoat 16 adheres to the indicator layer 12, it may also release from the indicator layer 10 without tearing the indicator layer 12 or removing the indicator apparatus 10 from the animal wearing it. Preferably, the floodcoat layer 16 is itself a "peel off" adhesive such that a further adhesive is not required to adhere the floodcoat layer 16 to the indicator layer 12. The adhesive floodcoat layer 16 should have good initial tack and moderate adhesion. Thus, for example, R-201 Blackout Adhesive manufactured by Wausau Coated Products may be used as the floodcoat layer. Alternately, the floodcoat 16 may be adhered to the indicator layer 12 by applying a separate adhesive to the bottom surface of the floodcoat layer or to the top surface of the indicator layer 12. Such adhesive, however, should be configured to release the floodcoat layer 16 from the indicator layer 12 upon application of a preselected amount of pressure to the indicator apparatus 10.

In a preferred embodiment, in order to remove the floodcoat layer 16 and thus expose the indicator layer 12, a preselected pressure must be applied to the indicator apparatus 10. This pressure is the pressure required to obtain sufficient adhesion of the floodcoat 16 to the top animal to thereby remove the floodcoat 16. The pressure required differs according to the intended breed of animals with which the indicator apparatus 10 is to be used and may vary from approximately 30 lbs force to approximately 300 or 400 pounds force.

A surface liner 20 is optionally provided along the adhesive surface of the floodcoat 16 to prevent soiling of the floodcoat layer 16 or adhesion of the floodcoat 16 to a non-selected surface. The surface liner 20 is preferably a peel off layer to be removed upon fixation of the indicator apparatus 10 on the first animal.

A further option is to configure the floodcoat 16 as a rubberized coating that adheres to the indicator layer 16 but is rubbed off by friction, for example the friction of the second animal mounting the first animal.

Figure 2:
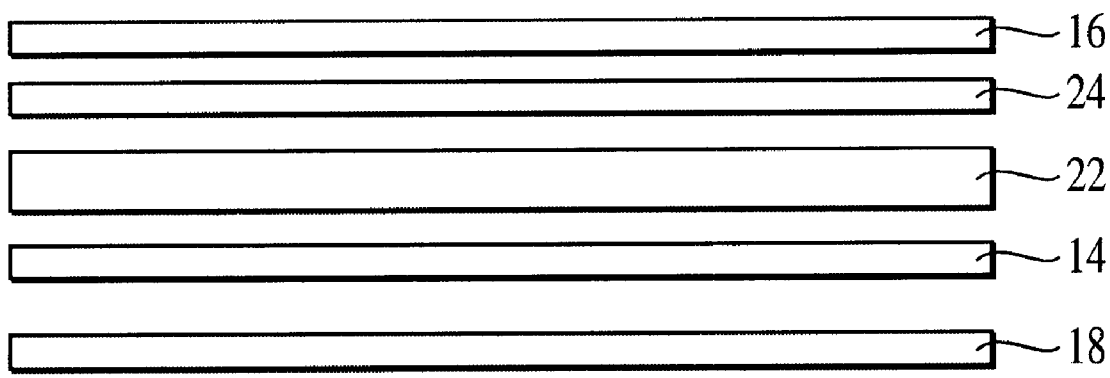
FIG. 2 is an exploded side view of a second embodiment of the invention.

FIG. 2 depicts an alternate embodiment of the invention wherein the indicator layer is a vinyl substrate or sheet 22. Preferably, the vinyl substrate or sheet 22 is manufactured of white flexible vinyl, which may alternatively be colored. If the vinyl substrate or sheet 22 is white, it is preferably inked or coated with a high-visibility pigment 24 that may be viewed from some distance and will not camouflage on any naturally-occuring color of heifer. Alternatively, the coating may be a colored coating, tint, or stain. The vinyl substrate or sheet 22 used in such an embodiment may be for example, Fasson® 4 Mil White Flexible Vinyl TC/S730/50#SCK manufactured by Fasson Roll North America (www.fasson.com) dyed with Akzo Nobel SS BW6 Warm Red manufactured by Akzo Nobel Inks Corp. (Plymouth, Minn.).

A rubber-based permanent adhesive 18 suitable for adhesion to the animal's hide is preferably applied to the hide-adhering surface of the vinyl indicator layer. This adhesive may, for example, be Fasson S730 as preloaded on Fasson Spec. #40087 vinyl.

Figure 3:
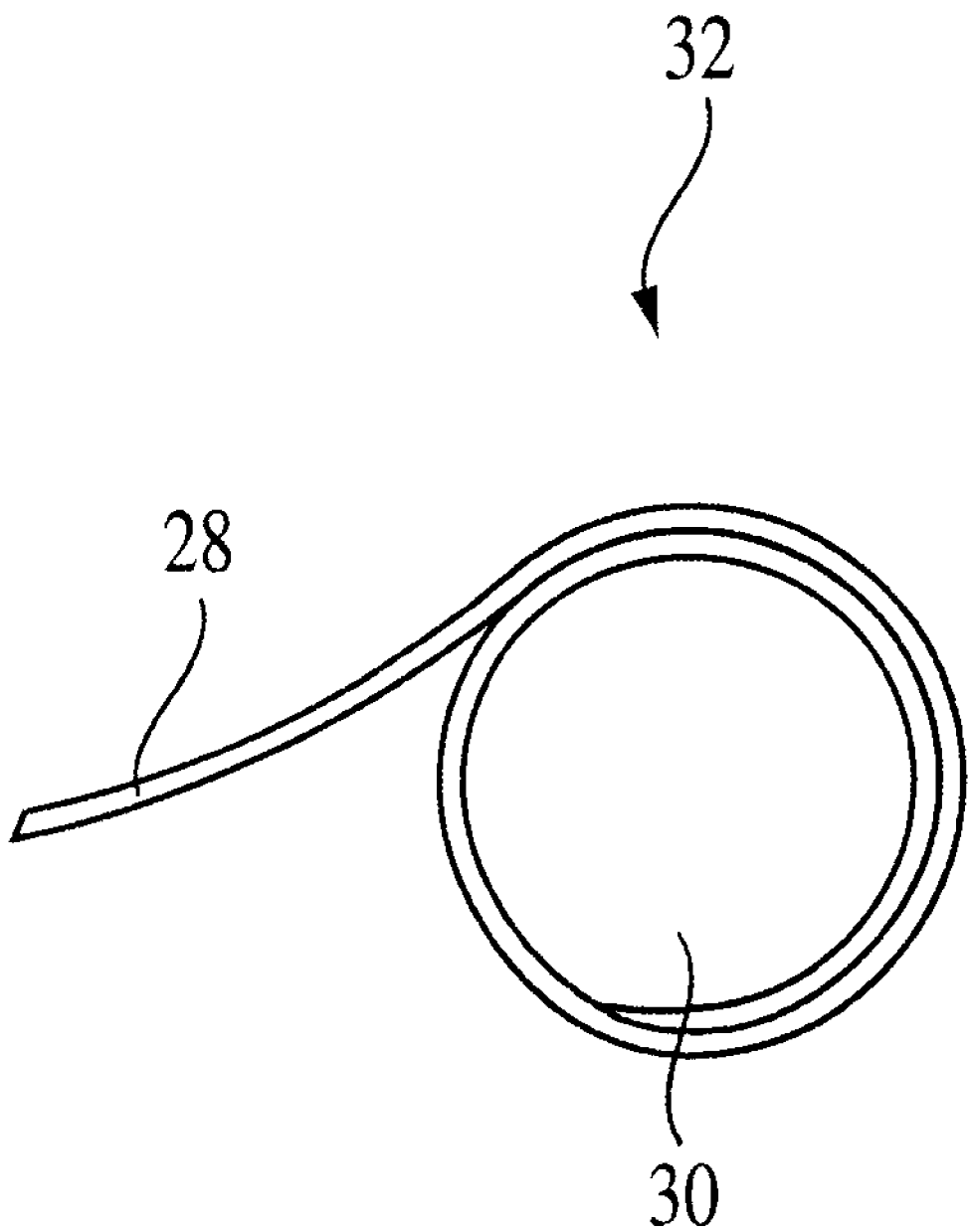
FIG. 3 is a perspective view of a preferred embodiment of the invention.

As seen in FIG. 3, a plurality of indicators according to the present invention may optionally be configured not as individual units or pieces but as a single sheet 28. The single sheet 28 may be configured as a planar surface or may be rolled on a cylinder 30. The sheet may then be cut as desired to variable sizes and/or shapes. The sheet thus provides flexibility in the specific size of the indicators. A preferred embodiment of the present invention involves an apparatus for supplying a plurality of indicators wherein the indicators are provided on a single sheet 28. The single sheet 28 is rolled on a cylinder 30. The cylinder 30 thus produces a roll 32 of indicator sheets that may be unrolled and cut as needed. The resultant roll is an inexpensive way of providing a plurality of indicators sizeable to specific needs and providing a simple storage of space indicators.

Preferably, the single sheet is simply cut into shape and size as desired by the user of the indicators. However, optionally, the sheet may be predivided with perforations between individual indicators.

Figure 4:
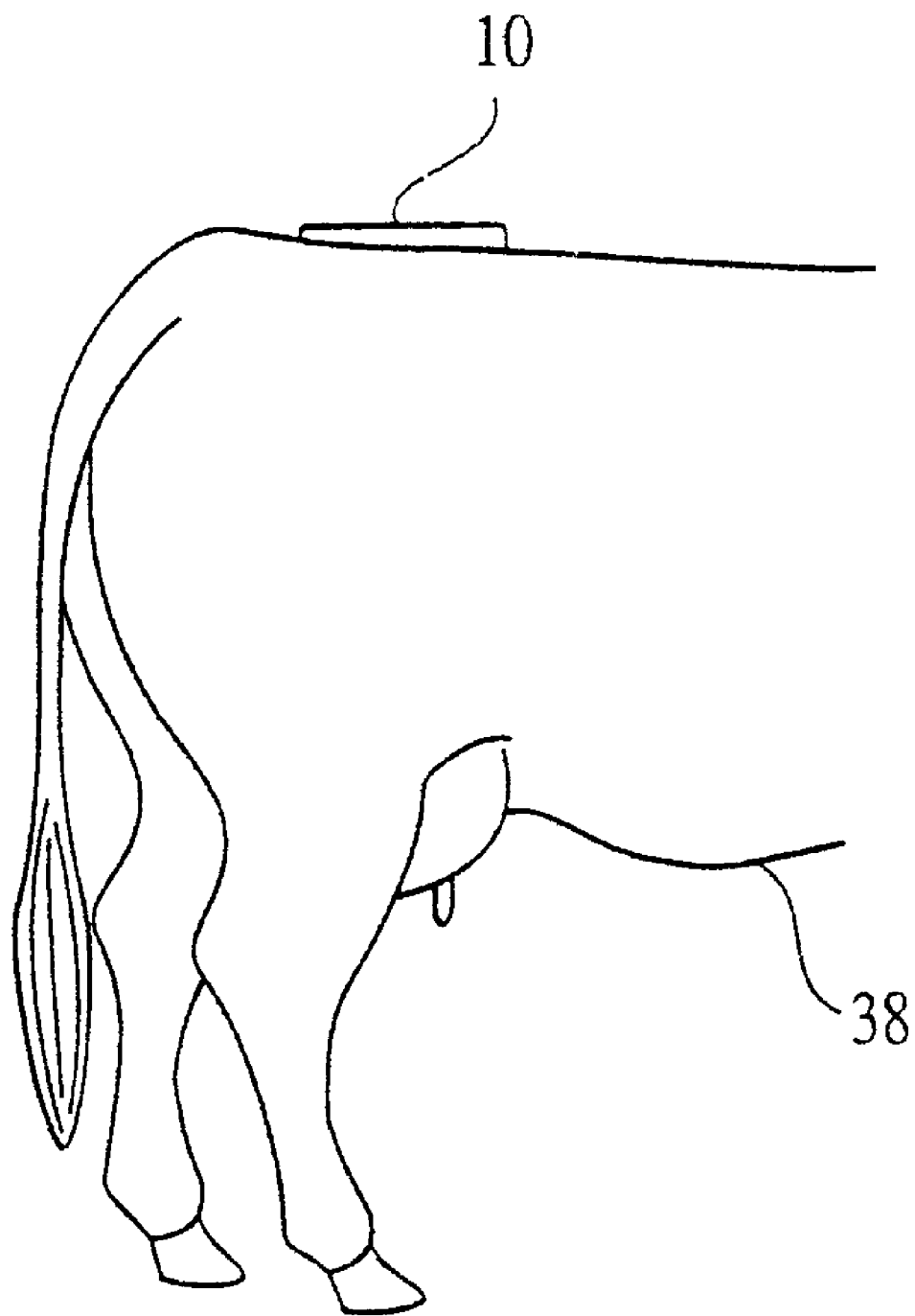
FIG. 4 is a perspective view of an embodiment of the invention in position on an animal.

FIG. 4 illustrates an estrus indicator 10 according to one embodiment of the present invention deployed on a heifer 38. As seen in FIG. 4, the apparatus is affixed to the rump of the animal on the spine at the base of the tail.

When a heifer wearing the apparatus comes into heat, the heifer is likely to be mounted by other heifers from the herd. When another heifer mounts the heifer wearing the apparatus, the floodcoat adheres to the front of the mounting heifer, pulling the floodcoat off of the indicator layer. Alternately, if the floodcoat is not adhesive on its outer surface (i.e., it adheres only to the indicator layer), the friction caused by the mounting heifer may be expected to rub off the mask layer. The mounted heifer is left wearing the indicator layer, which is visible from a distance, thus indicating that the heifer is in heat. The heifer may then be separated from the herd for insemination or mating. The floodcoat may be removed from the mounting heifer by manual removal, solvent, shaving the area to which the mask is adhered, or any other suitable method.

While particular embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

What is claimed is:

1. An estrus indicator adapted to be secured to the rump of a first animal for indicating when the first animal is in heat, the apparatus comprising:
    a first adhesive layer configured for affixing the estrus indicator to the first animal;
    an indicator layer; and
    a floodcoat layer removably affixed to the indicator layer and adapted for removal by a second animal upon mounting of the first animal by the second animal;
    a second adhesive layer positioned over the floodcoat layer;
    and a liner positioned over the second adhesive layer.

2. An estrus indicator adapted to be secured to the rump of a first animal for indicating when the first animal is in heat, the apparatus comprising:
    a first adhesive layer configured for affixing the estrus indicator to the first animal;
    an indicator layer; and
    a floodcoat layer removably affixed to the indicator layer and adapted for removal by a second animal upon mounting of the first animal by the second animal, the floodcoat layer being removably affixed to the indicator layer by a peel off configuration.

3. An estrus indicator adapted to be secured to the rump of a first animal for indicating when the first animal is in heat, the apparatus comprising:
    a first adhesive layer configured for affixing the estrus indicator to the first animal;
    an indicator layer; and
    a floodcoat layer removably affixed to the indicator layer and adapted for removal by a second animal upon mounting of the first animal by the second animal, the floodcoat layer being configured to be removed from the indicator layer via friction.

4. An estrus indicator adapted to be secured to the rump of a first animal for indicating when the first animal is in heat, the apparatus comprising:
    a first adhesive layer configured for affixing the estrus indicator to the first animal;
    an indicator layer; and
    a floodcoat layer removably affixed to the indicator layer and adapted for removal by a second animal upon mounting of the first animal by the second animal, the floodcoat layer being adapted to be removed only upon application of a predetermined pressure caused by the second animal mounting the first animal.

5. An apparatus for supplying a plurality of estrus indicators, the apparatus comprising:
    the plurality of estrus indicators, wherein each indicator is adapted to be secured to the rump of a first animal for indicating when the first animal is in heat and wherein each indicator further comprises a first adhesive layer configured for affixation to the first animal, an indicator layer, and a floodcoat layer removably affixed to the indicator layer and adapted for removal by a second animal upon mounting of the first animal by the second animal; and
    a base for holding the plurality of indicators;
    wherein the plurality of estrus indicators is configured as a single sheet.

6. The apparatus of claim 5 wherein the base is a cylinder and the sheet is rolled on the cylinder.

7. The apparatus of claim 6 wherein the plurality of estrus indicators are separated by a perforation between each adjacent indicator.

8. The apparatus of claim 6 wherein the plurality of estrus indicators are configured for separation by cutting the sheet into indicators sized as desired.

9. The apparatus of claim 5 wherein the base is a planar surface.

10. An estrus indicator adapted to be secured to the rump of a first animal for indicating when the first animal is in heat, the apparatus comprising:
    a first adhesive layer having a top surface and a bottom surface, the adhesive layer being configured for affixing the estrus indicator to the first animal;
    a removable liner attached to the bottom surface of the adhesive layer;
    a highly visible indicator layer having a top surface and a bottom surface, the indicator layer being positioned on the top surface of the adhesive layer; and
    a floodcoat layer removably affixed to the indicator layer and adapted for peel off removal upon application of a predetermined amount of pressure as applied by a second animal upon mounting of the first animal by the second animal.

11. An apparatus for supplying a plurality of estrus indicators, the apparatus comprising:
    the plurality of estrus indicators, wherein each indicator is adapted to be secured to the rump of a first animal for indicating when the first animal is in heat and wherein each indicator further comprises a first adhesive layer configured for affixation to the first animal, an indicator layer, and a floodcoat layer removably affixed to the indicator layer and adapted for removal by a second animal upon mounting of the first animal by the second animal; and a cylinder for holding the plurality of estrus indicators;

wherein the plurality of estrus indicators are configured as a single sheet, the sheet being rolled on the cylinder to produce a roll of indicator layers wherein the sheet may be cut into indicators sized as desired.

12. An estrus indicator adapted to be secured to the rump of a first animal for indicating when the first animal is in heat, the apparatus-comprising:

a first adhesive layer configured for affixing the estrus indicator to the first animal;

a vinyl indicator layer; and a floodcoat layer removably affixed to the indicator layer and adapted for removal by a second animal upon mounting of the first animal by the second animal.

13. An estrus indicator adapted to be secured to the rump of a first animal for indicating when the first animal is in heat, the apparatus comprising:

a first adhesive layer configured for affixing the estrus indicator to the first animal;

a crystal foil indicator layer; and a floodcoat layer removably affixed to the indicator layer and adapted for removal by a second animal upon mounting of the first animal by the second animal.

* * * * *